June 6, 1967  V. A. PARSLEY  3,323,383
RATCHET
Filed Feb. 3, 1965
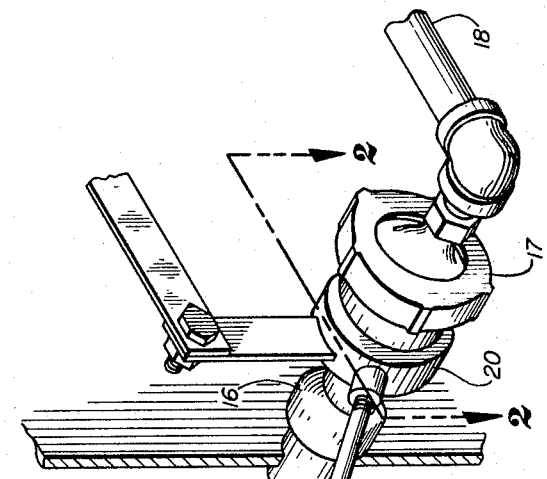
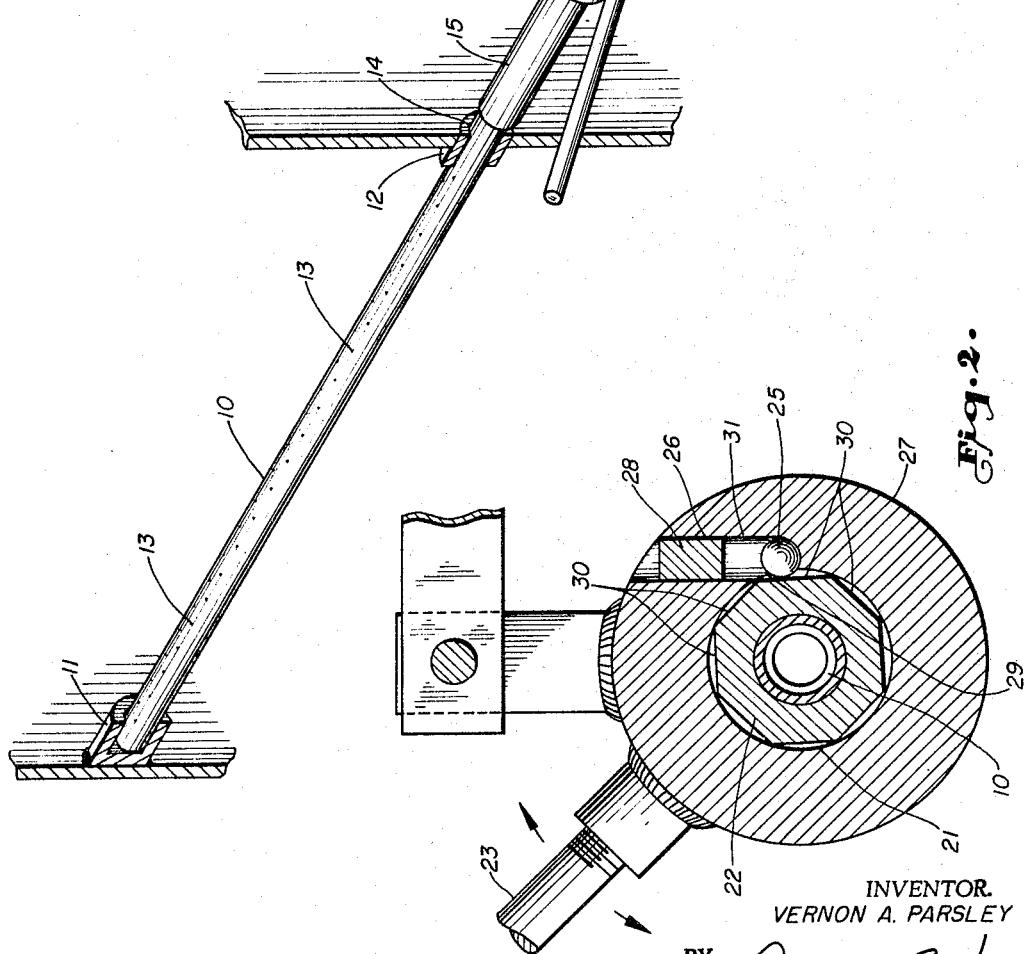
INVENTOR.
VERNON A. PARSLEY
BY Arthur L. Wade
ATTORNEY

United States Patent Office 3,323,383
Patented June 6, 1967

3,323,383
RATCHET
Vernon A. Parsley, Tulsa, Okla., assignor to Combustion Engineering, Inc., New York, N.Y., a corporation of Delaware
Filed Feb. 3, 1965, Ser. No. 430,068
2 Claims. (Cl. 74—156)

The present invention relates to mechanical structures which rotate elements in one direction in steps. More particularly, the invention is embodied in a ratchet which is manually reciprocated to advance the rotation of an elongated member in one direction.

Ratchets are inherently simple mechanisms. However, they generally employ teeth engaged by a pawl. The teeth are formed in a circle and attached to either the member to be rotated or the member reciprocated. The pawl is the link and is mounted on the other member.

An object of the present invention is to provide an extremely simple, yet effective, ratchet employing the sides of a nut as teeth and a freely moving object as a pawl.

The invention contemplates a multi-sided nut mounted on the member to be rotated and a solid object movable in a passage of a reciprocated member to wedge between a side and the passage wall as a link through which to advance the rotation of the member to be rotated and to be movable in the passage to permit relative rotation between the member to be rotated and the reciprocated member.

Other objects, advantages and features of this invention will become apparent to one skilled in the art upon consideration of the written specification, appended claims, and attached drawings, wherein:

FIG. 1 is an isometric view of a pipe to be rotated and a ratchet, in which the present invention is embodied, mounted on one end of the pipe; and FIG. 2 is a section taken along lines 2—2 of FIG. 1 showing the internal arrangement of the ratchet.

Referring to FIG. 1, there is shown part of a complete assembly for rotating a series of pipes with ratchet mechanisms. The specific pipe illustrated is indicated at 10, supported between two bearings 11 and 12. The pipe 10 is perforated at 13 to spray fluid conducted to the pipe 10. It is desired to rotate this pipe 10 about its longitudinal axis by the ratchet embodying the present invention.

Pipe end 14 is shown with an extension sleeve 15 mounted thereon. This is to illustrate that the pipe 10 may have such structure mounted on it to be actually cooperated with the ratchet. Also, the pipe 10, or extension 15, can pass through and/or be supported by packing structure 16 which will permit rotation of pipe 10.

In any structural arrangement illustrated in the drawings, or suggested by them, the invention contemplates mounting a multi-sided nut thereon as part of the ratchet. The nut is not apparent in FIG. 1, but connections through it, to the pipe 10 are indicated by gland 17.

Gland 17 is nothing more, or less than a seal which permits rotation of pipe 10 while fluid under pressure is fed into it. A spring and any of a number of sealing materials will prevent leaking of the pressure fluid fed into pipe 10 from conduit 18.

The ratchet of the present invention is housed at 20.

This housing 20 is a ring with a bore 21 within which nut 22 is carried. This housing is reciprocated by manual manipulation of handle 23. As the housing 20 is rocked back and forth, through a substantially stable angle, the ratchet mechanism advances the rotation of pipe 10 in steps.

There may be a plurality of pipes 10 to be simultaneously rotated. The housings 20 of all such pipes can be linked by very simple arrangements to impart the rocking of one to the others attached to it. The result is a simultaneous advance of the rotation of a number of pipes 10.

The ratchet of housing 20 essentially provides a link between the nut 22 and housing. When the housing is turned in one direction, the nut and attached pipe do not move; when the housing is turned in the other direction the nut and housing move together, linked solidly. This much is common ratchet function. The present invention is disclosed as using the sides of the nut and a movable element within a housing passage to provide the action.

Sphere 25 represents a movable solid object which is positioned to link nut 22 and housing 20. A passage 26 is drilled from the rim 27 to intersect hole 21. Sphere 25 moves freely along this passage 26, from plug 28 to hole 29. Hole 29 is not large enough to pass sphere 25, but a substantial portion of the sphere protrudes from the profile of the bore 21 and engages the surfaces 30 of the nut. This engagement forms the driving link of the ratchet.

Each pair of adjacent surfaces 30 intersect in a line, seen as points in FIG. 2. As these lines move clockwise within bore 21, the leading surface 30 pushes sphere 25 against wall 31 of passage 26. Finally, the three elements are jammed together, the surface 30, the sphere 25 and the wall 31. Continued movement of housing 20 then transmits its moving force to the nut 22 and pipe 10 turns.

After housing 20 has been carried to the limit of its travel, clockwise, it is rotated clockwise. Counter-clockwise rotation of housing 20, relative to nut 22, will cause the same surface 30 to move sphere 25 upward, toward plug 28. The sphere is free to move up passage 26, moving far enough to clear the profile of bore 21. The counter-clockwise rotation of housing 20 then has no influence on nut 22. The two rotate relative to each other until housing 20 reaches the other end of its limit of travel.

The housing 20 then reciprocates as handle 23 is manipulated. Each clockwise stroke advances pipe 10 a step. Each counter-clockwise stroke repositions the housing to advance the pipe rotation again. A simple ratchet is formed, using a ring form of housing 20, a standard multi-sided nut and an object movable within a passage of the housing.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A ratchet structure including,
   a ring-shaped housing with a bore therethrough, to receive a member to be rotated,
   a passage formed in the housing tangentially extending and arranged to terminate in the bore,
   and a movable object in the passage sized to prevent passage through the opening into the bore but protruding through the opening beyond the profile of the bore to engage the member to be rotated as a link between the member and housing when the housing is rotated in one of its two directions of rotation.

2. The ratchet of claim 1 in which the movable object is a sphere and the passage is a cylindrical hole.

References Cited

UNITED STATES PATENTS

| | | | |
|---|---|---|---|
| 1,119,900 | 12/1914 | Vacarezza | 74—156 |
| 1,375,576 | 4/1921 | Duca | 192—44 |
| 2,584,256 | 2/1952 | Brown | 192—44 |

FOREIGN PATENTS 244,678  5/1947  Switzerland.

FRED C. MATTERN, Jr., *Primary Examiner.*

W. S. RATLIFF, *Assistant Examiner.*